Patented Oct. 13, 1942

2,298,984

UNITED STATES PATENT OFFICE 2,298,984

IRON OXIDE WEIGHTING MATERIAL FOR DRILLING MUDS

Thane K. Stinson, East St. Louis, Ill., and Lorenz K. Ayers, St. Louis, Mo., assignors, by mesne assignments, to National Lead Company, New York, N. Y., a corporation of New Jersey No Drawing. Application May 28, 1937, Serial No. 145,380

8 Claims. (Cl. 252—8.5)

This invention relates to iron oxide weighting materials for use in drilling muds employed primarily in drilling oil and gas wells and to methods of preparing the same.

Iron oxide weighting materials have been in use for sometime but have not given complete satisfaction. The object of the present invention is to produce materials superior to any heretofore known and having the most desirable chemical and physical characteristics possible for the functions they are to perform.

The iron oxide weighting materials of the present invention prepared in accordance with the preferred embodiment (1) possess a high specific gravity, that is, from 4 to 5, (2) are of a fine particle size and cellular surface structure whereby drilling muds produced through their use possess the most advantageous viscosity and do not permit rapid segregation of coarser fractions, packing or hard settling, (3) are substantially free of water-soluble sulfur compounds and other impurities which objectionably increase the viscosity or the thixotropy of the clay suspensions, and (4) possess a pH value slightly greater than 7.

Weighting materials having these properties are readily obtained in an economical manner in accordance with the process of the invention by the proper selection of raw material and by the proper treatment of such raw material as hereinafter described. Of the many natural and artificial iron oxides which might be used, we have found that the iron oxide cinder obtained from the iron sulfide minerals, pyrite or marcasite, which have been roasted for sulfur recovery is definitely superior to all others. The residual sulfur in said cinder usually amounts to from 2 to 10%. Although pyrite cinder has heretofore been used as raw material for producing weighting materials, the methods used in such production have not been capable of producing products which consistently form drilling muds of the proper or most suitable viscosity and thixotropy characteristics.

In accordance with the present invention, the process in its broader aspects involves calcining pyrite cinder to reduce its sulfide and sulfate content, grinding the resulting mass to the proper degree of fineness and then removing as by washing, substantially all of the soluble salts present, in particular the calcium, magnesium and sulfate salts.. The preferred degree of fineness in the finished product is one corresponding to a screen analysis of approximately 95% through 325 mesh.

In the initial step of the instant process, the pyrite cinder is calcined in a rotary kiln or other suitable kiln at a temperature of from 1800 to 2200° F. to effect decomposition of as large a proportion of the sulfides and sulfates as is possible. This decomposition may be effected in a neutral, oxidizing or reducing atmosphere, the oxidizing atmosphere being preferred. By this treatment, generally stated, a pyrite cinder containing less than 2% residual sulfur has its content of water soluble compounds reduced to not more than about 0.2%; a typical pyrite cinder having 1.58% sulfur in the form of sulfides and 3.31% sulfur in the form of sulfates is converted to one having 0.07% sulfide sulphur and 1.47% sulfate sulfur. Although this calcined cinder after being cooled and ground may be used to advantage as a weighting material, we have discovered that the water soluble salts remaining in said material impart objectionable properties thereto in causing in some formational muds a detrimental increase in viscosity and in thixotropy. Therefore, in accordance with the process of the present invention, these water soluble impurities are removed, the same being accomplished by washing the ground calcined cinder until the mass is substantially free of such impurities or contains not more than about 0.2%.

These water soluble impurities, we have found, are not readily separable from conventional dry ground iron oxide cinder and ordinary washing methods upon such cinder are inefficient or ineffective. In accordance with a feature of the instant invention, the removal of the impurities is accomplished in a simple, efficient and economical manner, by wet grinding the roasted pyrite cinder in a tube or ball mill and then washing. The wet milling not only promotes a more complete and rapid solution of the water soluble impurities but also hastens the hydrolysis of traces of any unconverted sulfides contained therein.

Any suitable washing process may be used but the preferred procedure involves a countercurrent washing train employing a suitable number of thickener tanks through which the ground product and water are passed. Since the dehydrated salts and other impurities are difficultly soluble, the washing operation should be preceded by a treatment in a turbomixer wherein the calcined cinder is violently agitated in the presence of a large amount of water over an extended period. The product after this treatment is then filter pressed or filtered on a rotary vacuum filter to the lowest economic moisture content and then dried by introducing the same continuously into a rotary drier wherein the temperature is maintained at a point sufficiently low to prevent nodulization or agglomeration of the fine particles.

In accordance with a specific feature of the present invention, the roasting operation is greatly facilitated by being hastened and being made more complete through incorporating in the pyrite cinder before the calcining operation a quantity of an accelerator or catalyst which may, for example, be any of the common alkali metal salts, such as sodium chloride, sodium sulfate or potassium chloride, which compounds are referred to collectively as "alkali metal salt accelerating agents." The quantity used varies with the particular cinder treated in proportion to its residual sulfur content and surface characteristics desired. Usually from 0.10 to 5% is sufficient.

In accordance with another specific but important feature of the present invention, the ground pyrite cinder is treated by adding thereto a small quantity of an alkaline agent, any alkali being suitable, sufficient to produce a pH value slightly greater than 7. This addition has been found to promote uniformity of mud control, to lessen the coagulating tendency of the weighting material upon formational muds and to lessen the corrosive effect on pumps and other equipment, the latter being the least important of its functions. The addition of the alkali may be conveniently and effectively accomplished in the instant process by adding the desired amount to the wash water employed in the final washing thickener tank.

The pH value of the weighting material, as referred to in the specification and claims, is determined by stirring 25% by weight of the dry weighting material into distilled water, allowing the resulting suspension to settle, and then determining the pH of the supernatant liquid by means of a standard glass electrode pH meter. Thus the pH value of the material corresponds to the pH of a water extract of the material.

The process of the invention as described up to the present time has called for the use of ordinary pyrite cinder as the raw material, containing several percent of residual sulfur, which material requires an additional calcination treatment in order that satisfactory results be obtained. It should be understood, however, that we realize the possibility that pyrite cinder in the future may be available on the market which has been produced under conditions yielding a product containing less than 2% residual sulfur in which case recalcination may not be necessary.

It should be understood that the instant invention is not limited to the specific materials nor to the exact procedural steps disclosed herein but that it extends to all equivalent materials and alternative procedures within the scope of the terms of the appended claims.

We claim:
1. The process of producing iron oxide weighting materials for use in drilling muds which comprises calcining pyrite cinder at a temperature of at least 1800° F. and in the presence of an alkali metal salt accelerating agent to reduce its sulfide and sulfate content, grinding it, and washing out substantially all of the soluble salts present.

2. The process of producing iron oxide weighting materials for use in drilling muds which comprises calcining pyrite cinder at a temperature of at least 1800° F. and in the presence of an alkali metal salt accelerating agent to reduce its sulfide and sulfate content, wet grinding it, and washing it whereby substantially all of the soluble salts are removed.

3. In the production of iron oxide weighting materials for use in drilling muds from calcined pyrite cinder, the steps which comprise wet grinding calcined pyrite cinder containing less than 2% of residual sulfur and washing the ground material until the content of water soluble salts is reduced below 2%.

4. The process of producing iron oxide weighting materials for use in drilling muds which comprises calcining pyrite cinder at a temperature of from 1800 to 2200° F. in the presence of an alkali metal salt accelerating agent whereby a portion of the sulfides and sulfates present are removed, grinding the partially purified cinder and washing out substantially all of the soluble impurities present.

5. The process of producing iron oxide weighting materials for use in drilling muds which comprises calcining pyrite cinder at a temperature of from 1800 to 2200° F. in the presence of an alkali metal salt accelerating agent whereby a portion of the sulfides and sulfates present are removed, grinding the partially purified cinder in the presence of water, and washing out substantially all of the soluble impurities present.

6. The process of producing iron oxide weighting materials for use in drilling muds which comprises grinding pyrite cinder containing less than about .2%, then separating the resulting fine particles with water until their content of water soluble compounds is reduced to not more than about .2%, then separating the resulting finely divided iron oxide particles from the water.

7. A weighting material for drilling muds comprising pyrite cinder of a mesh suitable for suspension in a drilling mud and substantially free of viscosity-increasing sulphur compounds.

8. A weighting material for drilling muds comprising pyrite cinder of a mesh suitable for suspension in a drilling mud and containing sufficient of an alkaline agent to inhibit viscosity increase of the drilling mud by the material.

THANE K. STINSON.
LORENZ K. AYERS.

CERTIFICATE OF CORRECTION.

Patent No. 2,298,984.    October 13, 1942.

THANE K. STINSON, ET AL.

It is hereby certified that error appears in the printed specification of the above numbered patent requiring correction as follows: Page 2, second column, line 24, claim 3, for "2%" read --.2%--; line 47, claim 6, for "about .2%, then separating" read --2% residual sulfur, agitating--; and that the said Letters Patent should be read with this correction therein that the same may conform to the record of the case in the Patent Office.

Signed and sealed this 24th day of November, A. D. 1942.

(Seal)

Henry Van Arsdale,
Acting Commissioner of Patents.